US010431252B2

(12) United States Patent
Tamaki et al.

(10) Patent No.: US 10,431,252 B2
(45) Date of Patent: *Oct. 1, 2019

(54) SUBSTRATE FOR MAGNETIC DISK AND MAGNETIC DISK

(71) Applicant: HOYA CORPORATION, Tokyo (JP)

(72) Inventors: Masanori Tamaki, Higashimurayama (JP); Takeyoshi Takahashi, Akishima (JP); Masaaki Ueda, Yokohama (JP)

(73) Assignee: HOYA CORPORATION, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 15/441,931

(22) Filed: Feb. 24, 2017

(65) Prior Publication Data
US 2017/0169848 A1    Jun. 15, 2017

Related U.S. Application Data

(63) Continuation of application No. 14/767,515, filed as application No. PCT/JP2014/054384 on Feb. 24, 2014, now Pat. No. 9,595,284.

(30) Foreign Application Priority Data

Feb. 22, 2013    (JP) ................................. 2013-033719

(51) Int. Cl.
  *G11B 5/82*    (2006.01)
  *G11B 5/73*    (2006.01)
  *G11B 5/84*    (2006.01)

(52) U.S. Cl.
  CPC .............. *G11B 5/82* (2013.01); *G11B 5/7315* (2013.01); *G11B 5/8404* (2013.01)

(58) Field of Classification Search
None
See application file for complete search history.

(56) References Cited

U.S. PATENT DOCUMENTS 5,872,069 A    2/1999  Abe
7,071,132 B2   7/2006  Minamikawa et al.
(Continued)

FOREIGN PATENT DOCUMENTS

CN    1675712 A      9/2005
CN    101896972 A    11/2010
(Continued)

OTHER PUBLICATIONS

International Search Report in PCT/JP2014/054384 dated May 13, 2014.
Office Action in the corresponding Japanese Patent Application No. 2015-033361 dated Jun. 13, 2017.
(Continued)

*Primary Examiner* — Kevin M Bernatz
(74) *Attorney, Agent, or Firm* — Global IP Counselors, LLP

(57) ABSTRACT

A magnetic-disk glass substrate has a circular hole at a center, and includes a pair of main surfaces and a side wall surface orthogonal to the main surfaces. A roundness of the circular hole is 1.5 μm or less. A difference between a maximum value and a minimum value of radii of three inscribed circles that are respectively derived from outlines in the circumferential direction at three positions spaced apart by 200 μm in a substrate thickness direction on the side wall surface of the circular hole is 3.5 μm or less.

20 Claims, 5 Drawing Sheets

(56) References Cited

U.S. PATENT DOCUMENTS

| | | | |
|---|---|---|---|
| 8,241,768 B2 | 8/2012 | Takizawa et al. | |
| 9,583,128 B2 * | 2/2017 | Takahashi | G11B 5/73 |
| 9,595,283 B2 * | 3/2017 | Tamaki | G11B 5/7315 |
| 9,595,284 B2 * | 3/2017 | Tamaki | G11B 5/7315 |
| 9,595,286 B2 * | 3/2017 | Tamaki | G11B 5/7315 |
| 9,697,860 B2 * | 7/2017 | Ueda | G11B 5/73 |
| 2008/0241603 A1 | 10/2008 | Isono | |
| 2009/0233529 A1 | 9/2009 | Ueda | |
| 2010/0266874 A1 | 10/2010 | Uchiyama et al. | |
| 2010/0273030 A1 | 10/2010 | Kitsunai et al. | |

FOREIGN PATENT DOCUMENTS

| | | |
|---|---|---|
| JP | 2004-079009 A | 3/2004 |
| JP | 2006-099936 A | 4/2006 |
| JP | 2007-229912 A | 9/2007 |
| JP | 2008-105171 A | 5/2008 |
| JP | 2008-217918 A | 9/2008 |
| JP | 2008-226376 A | 9/2008 |
| JP | 2012-113802 A | 6/2012 |
| JP | 2013-028512 A | 2/2013 |
| WO | 2010041537 A1 | 4/2010 |
| WO | 2011/096310 A1 | 8/2011 |

OTHER PUBLICATIONS

Office Action translated into Japanese in the corresponding Chinese Patent Application No. 201480009236.X dated Jul. 4, 2017.
Office Action translated into Japanese in the corresponding Chinese Patent Application No. 201810659065.5, dated Jul. 3, 2019.

* cited by examiner

SUBSTRATE FOR MAGNETIC DISK AND MAGNETIC DISK

CROSS-REFERENCE TO RELATED APPLICATIONS

This is a continuation of U.S. patent application Ser. No. 14/767,515, filed on Aug. 12, 2015, now U.S. Pat. No. 9,595,284, which is a U.S. National stage application of International Patent Application No. PCT/JP2014/054384, filed on Feb. 24, 2014, which, in turn, claims priority under 35 U.S.C. § 119(a) to Japanese Patent Application No. 2013-033719, filed in Japan on Feb. 22, 2013, the entire contents of which are hereby incorporated herein by reference.

BACKGROUND

Field of the Invention

The present invention relates to a magnetic-disk glass substrate and a magnetic disk.

Background Information

Nowadays, personal computers, digital versatile disc (DVD) recorders, and the like have a built-in hard disk drive (HDD) for data recording. In particular, in a hard disk drive that is used in a device premised on portability such as a notebook-type personal computer, a magnetic disk in which a magnetic layer is provided on a glass substrate is used, and magnetic recording information is recorded on or read from the magnetic layer with a magnetic head that flies slightly above the surface of the magnetic disk. A glass substrate is unlikely to be plastically deformed compared with a metal substrate (aluminum substrate) or the like, and thus is preferably used as the substrate of this magnetic disk.

Moreover, the density of magnetic recording has been increased to meet the demand for an increase in the storage capacity of hard disk drives. For example, the magnetic recording information area has been made smaller using a perpendicular magnetic recording system that causes the direction of magnetization in the magnetic layer to be perpendicular to the surface of the substrate. This makes it possible to increase the storage capacity per disk substrate. In such a disk substrate, it is preferable that the substrate surface is made as flat as possible and the direction in which magnetic particles grow is arranged in the vertical direction such that the direction of magnetization in the magnetic layer faces in a substantially perpendicular direction relative to the substrate surface.

Also, in order to further increase the storage capacity, by using a magnetic head equipped with a dynamic flying height (DFH) mechanism to make the flying height of the magnetic head from the magnetic recording surface extremely short, the magnetic spacing between the recording and reproducing element of the magnetic head and the magnetic recording layer of the magnetic disk is reduced, thus further improving the accuracy of the recording and reproducing of information (improving the S/N ratio). Also in this case, it is required to make the surface unevenness of a magnetic-disk substrate as small as possible in order for the magnetic head to stably read/write magnetic recording information over a long period of time.

Servo information that is to be used to position the magnetic head at a data track is recorded on the magnetic disk. It is conventionally known that when the roundness of an edge surface of the magnetic disk on the outer circumferential side (also referred to as "outer circumferential edge surface" hereinafter) is reduced, the magnetic head flies stably, and thus the servo information is favorably read, and the magnetic head stably reads/writes information. For example, the technique described in JP 2008-217918A discloses a magnetic-disk glass substrate in which the roundness of the outer circumferential edge surface is 4 μm or less. With this glass substrate, the durability against load/unload (LUL) testing is improved by reducing the roundness of the outer circumferential edge surface.

SUMMARY

Incidentally, in recent years, a magnetic disk provided with an extremely high track recording density of 500 kTPI or more has become practically viable due to the progress of elemental technology such as energy-assisted magnetic recording technology and shingle writing technology. However, when the magnetic disk provided with such an extremely high track recording density was incorporated into a spindle and a HDD was assembled, it was found that there were cases in which even when a magnetic disk having a sufficiently reduced (small) roundness of a circular hole at the center (appropriately referred to as "inner hole" hereinafter) was used (magnetic disk in which the roundness of the inner hole is 1.5 μm or less, for example), a level of fluttering (a phenomenon where the magnetic disk vibrates (rattles) due to the rotation of the magnetic disk) increased during high speed rotation of the magnetic disk.

In view of this, an object of the present invention is to provide a magnetic-disk glass substrate and a magnetic disk that are capable of reducing fluttering of the magnetic disk during high speed rotation.

Regarding the above-described issues, the inventors studied variation in the thickness of a magnetic disk having a high level of fluttering in a HDD and the roughness and microwaviness of a main surface, but no particular anomalies could be confirmed. The inventors assumed that the reason why the level of fluttering increased was as follows.

In particular, in the magnetic disk using energy-assisted magnetic recording technology, the particle size of magnetic particles is reduced in order to perform high density recording, and in order to suppress deterioration in magnetic characteristics due to thermal fluctuation resulting from a reduction in the particle size, so-called high Ku magnetic material (such as Fe—Pt-based or Co—Pt-based magnetic material having a high magnetic anisotropy energy) is used. This high Ku magnetic material needs to obtain a specific crystal orientation state in order to achieve a high Ku, and therefore, it is necessary to perform heat processing at a high temperature when or after film formation at a high temperature. In order to form a magnetic recording layer made of these high Ku magnetic materials, a glass substrate needs to have a high heat resistance that can withstand the above-described high temperature processing, or in other words, the glass substrate needs to have a high glass transition temperature (600 to 700° C. or more, for example). There are cases where in order to have a high heat resistance, a glass material having a smaller coefficient of thermal expansion (CTE) than that of a conventional glass material is used in a magnetic-disk glass substrate using energy-assisted magnetic recording technology. Stretching of the glass substrate during the heat processing can be suppressed by reducing the coefficient of thermal expansion, and thus a risk of deformation or cracking of the disk by a holding member that holds the substrate during the heat processing, dropping of the disk from the holding member, or the like can be reduced.

However, although the coefficient of thermal expansion of the glass material for a conventional magnetic-disk glass substrate is relatively large value (from $90\times10^{-7}$ to $100\times10^{-7}$ [$K^{-1}$], for example) in order to approximate to the coefficient of thermal expansion of the spindle material, in the case where a magnetic-disk glass substrate is produced using a glass material having a smaller coefficient of thermal expansion than that of a conventional glass material, the difference in coefficient of thermal expansion between the materials of the magnetic-disk glass substrate and the spindle is greater than that when the conventional glass material is used. It is thought that if the difference between both coefficients of thermal expansion is great, in the case where, after a HDD is assembled, the HDD is placed in a high temperature atmosphere through performing a heat cycle test or the like on the HDD, the spindle greatly expands relative to the glass substrate, and locally abuts strongly against the inner hole of the magnetic disk, as a result of which the magnetic disk is slightly distorted. In other words, it is thought that even in the case where the inner hole of the magnetic disk is provided with sufficiently favorable roundness by conventional standards, if the precision of the three-dimensional shape of the inner hole is not high, stress is applied due to the spindle locally abutting strongly against the inner hole of the magnetic disk, and thus the magnetic disk is slightly distorted (warped).

It should be noted that the roundness of the inner hole has been conventionally measured by inserting a plate-shaped probe that is longer than the thickness of the glass substrate into the inner hole in the vertical direction with respect to the main surface of the glass substrate and scanning the inner hole in the circumferential direction. At this time, the probe comes into contact with the substrate at a position in the substrate thickness direction that projects most centrally. Accordingly, the shape projecting furthest toward the center of the substrate is reflected in the outline of the inner hole that serves as a basis of the roundness measurement, independently of the shape of the inner hole in the substrate thickness direction. Therefore, with the conventional method for measuring roundness, the roundness could not serve as an index for evaluating the three-dimensional shape of the side wall surface of the inner hole in the substrate thickness direction. In other words, in the case where the inner hole of the magnetic disk was provided with sufficiently favorable roundness based on the conventional method for measuring the roundness, there may be cases where the precision of the three-dimensional shape of the inner hole is not high.

If the magnetic disk is slightly distorted as described above, the level of fluttering increases when the magnetic disk is rotated at high speed due to this slight distortion. It is thought that an increase in the level of fluttering leads to problems such as the accuracy of positioning the magnetic head at a data track of the HDD being deteriorated. In particular, with a high TPI HDD, in order to suppress the eccentricity of the magnetic disk during rotation that adversely influences the accuracy in positioning the magnetic head at a data track of the HDD, play between the diameter of the spindle and the inner diameter of the magnetic disk is thought to have become extremely small at 20 μm or less, and thus it is conceivable that this small play amount facilitates the spindle coming into local contact with the inner hole of the magnetic disk due to the difference in CTE described above. Also, the problem of fluttering resulting from the distortion of the substrate described above is more marked in a HDD in which the substrate rotates at a high speed of 10000 rpm or more.

As a result of further intensive studies based on the above-described assumption, the inventors found that the degree of fluttering described above is associated with the precision of the three-dimensional shape of the inner hole of the magnetic disk. In other words, it is conceivable that even in the case where the roundness of the inner hole of the magnetic disk is sufficiently increased, if the precision of the three-dimensional shape is not high, the spindle will come into local contact strongly with the side wall surface of the magnetic disk on the inner hole side and the magnetic disk is likely to be distorted, and thus the level of fluttering increases. On the other hand, it is conceivable that in the case where not only a favorable roundness of the inner hole of the magnetic disk but also a favorable precision of the three-dimensional shape are achieved, the spindle comes into contact (that is, comes into surface contact) with the entire side wall surface of the magnetic disk on the inner hole side, and thus the magnetic disk is unlikely to be distorted, and the level of fluttering is unlikely to become significant.

From the point of view described above, a first aspect of the present invention is a magnetic-disk glass substrate having a circular hole at a center, and including a pair of main surfaces and a side wall surface orthogonal to the main surfaces, a roundness of the circular hole being 1.5 μm or less, and a difference between a maximum value and a minimum value of radii of three inscribed circles that are respectively derived from outlines in a circumferential direction at three positions spaced apart by 200 μm in a substrate thickness direction on the side wall surface of the circular hole being 3.5 μm or less.

A second aspect of the present invention is a magnetic-disk glass substrate having a circular hole at a center, and including a pair of main surfaces and a side wall surface orthogonal to the main surfaces, a substrate thickness being 0.635 mm or less, a roundness of the circular hole being 1.5 μm or less, and a difference between a maximum value and a minimum value of radii of three inscribed circles that are respectively derived from outlines in a circumferential direction at three positions spaced apart by 100 μm in a substrate thickness direction on the side wall surface of the circular hole being 3.5 μm or less.

In the above-described magnetic-disk glass substrate, it is preferable that a surface roughness Rz of the side wall surface of the circular hole is 0.2 μm or less. In the above-described magnetic-disk glass substrate, it is preferable that an average coefficient of thermal expansion from 100° C. to 300° C. is $60\times10^{-7}$ [$K^{-1}$] or less.

In the above-described magnetic-disk glass substrate, with regard to the surface roughness of the side wall surface of the circular hole, in a case where a maximum height in the substrate thickness direction is Rz(t) and a maximum height in the circumferential direction is Rz(c), it is preferable that Rz(t)/Rz(c) is 1.2 or less. In the above-described magnetic-disk glass substrate, when a measurement point is provided every 30 degrees in the circumferential direction referenced on the center of the glass substrate, and a radius of curvature of a shape of a portion between the side wall surface and a chamfered surface of the circular hole at the measurement point is derived, it is preferable that a difference in the radius of curvature between adjacent measurement points is 0.01 mm or less.

A third aspect of the present invention is a magnetic disk in which a magnetic layer is formed on a main surface of the above-described magnetic-disk glass substrate.

DESCRIPTION OF EMBODIMENTS

Figure 1A:
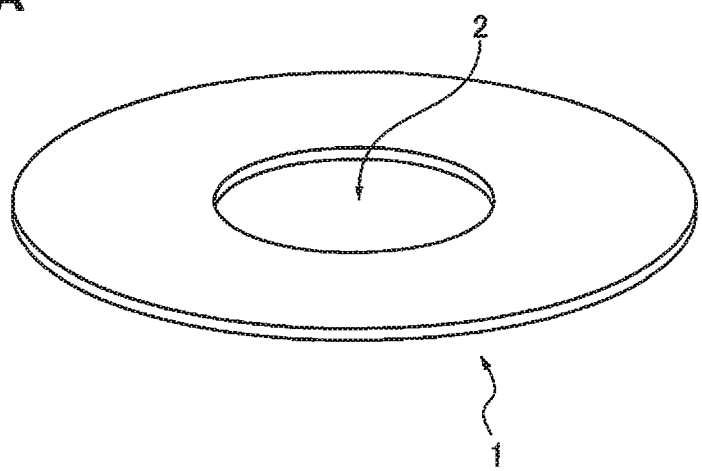
FIG. 1A is a diagram showing an external shape of a magnetic-disk glass substrate of the present embodiment.

Hereinafter, a magnetic-disk glass substrate of this embodiment and a method for manufacturing the same will be described in detail.
[Magnetic-Disk Glass Substrate]

Aluminosilicate glass, soda-lime glass, borosilicate glass, or the like can be used as a material for a magnetic-disk glass substrate of the present embodiment. In particular, aluminosilicate glass can be preferably used because it can be chemically strengthened and be used to produce a magnetic-disk glass substrate having excellent flatness of its main surfaces and excellent strength of the substrate. Furthermore, amorphous aluminosilicate glass facilitates improving smoothness of the surface, such as roughness, and is more preferable.

Although there is no limitation on the composition of the glass material that is used for the magnetic-disk glass substrate of the present embodiment, the glass substrate of the present embodiment may preferably be amorphous aluminosilicate glass containing $SiO_2$, $Li_2O$, and $Na_2O$ and one or more alkaline earth metal oxides selected from the group of consisting of MgO, CaO, SrO, and BaO as essential components, and having a molar ratio of the content of CaO to the total content of MgO, CaO, SrO, and BaO (CaO/(MgO+CaO+SrO+BaO)) of 0.20 or less, and a glass transition point of 650° C. or more.

The glass substrate may also be crystallized glass containing, in terms of oxide amount in mass %, $SiO_2$ in an amount of 45.60 to 60%, $Al_2O_3$ in an amount of 7 to 20%, $B_2O_3$ in an amount of 1.00 to less than 8%, $P_2O_5$ in an amount of 0.50 to 7%, $TiO_2$ in an amount of 1 to 15%, and RO (it should be noted that R represents Zn and Mg) in a total amount of 5 to 35%, CaO in an amount of 3.00% or less, BaO in an amount of 4% or less, no PbO component, no $As_2O_3$ component, no $Sb_2O_3$ component, no $Cl^-$ component, no $NO^-$ component, no $SO^{2-}$ component, no $F^-$ component, and one or more selected from $RAl_2O_4$ and $R_2TiO_4$ (it should be noted that R represents one or more selected from Zn and Mg) as a main crystal phase, in which the particle size of crystals in the main crystal phase is in a range of 0.5 nm to 20 nm, the degree of crystallization is 15% or less, and the specific gravity is 2.95 or less.

The magnetic-disk glass substrate having such a composition has a Tg of 650° C. or more and has high heat resistance, and thus is preferable for a magnetic-disk glass substrate to be used for a magnetic disk for energy-assisted magnetic recording. Also, such a magnetic-disk glass substrate is preferable because it is possible to set a coefficient of thermal expansion (CTE) to $60 \times 10^{-7}$ $[K^{-1}]$ or less. It should be noted that the coefficient of thermal expansion referred to in this specification indicates an average coefficient of thermal expansion calculated using the rate of thermal expansion of the glass substrate at a temperature of 100° C. and 300° C.

The glass material having the above-described composition is merely an example. The glass material may have another composition that can be used as the magnetic-disk glass substrate as long as the shape of a circular hole, which will be described later, is satisfied.

FIG. 1A shows an external shape of a magnetic-disk glass substrate 1 of the embodiment. As shown in FIG. 1A, the magnetic-disk glass substrate 1 according to the present embodiment is a thin doughnut-shaped glass substrate having an inner hole 2 (circular hole) at the center. Although there is no limitation on the size of the magnetic-disk glass substrate 1, the magnetic-disk glass substrate 1 is preferably formed as a magnetic-disk glass substrate having a nominal diameter of 2.5 inches, for example. It should be noted that the thickness (0.635 mm, 0.8 mm, or the like) of the magnetic-disk glass substrate referred to in the description below is a nominal value and the actual measurement value may be slightly thicker or thinner than the nominal value.

Figure 1B:
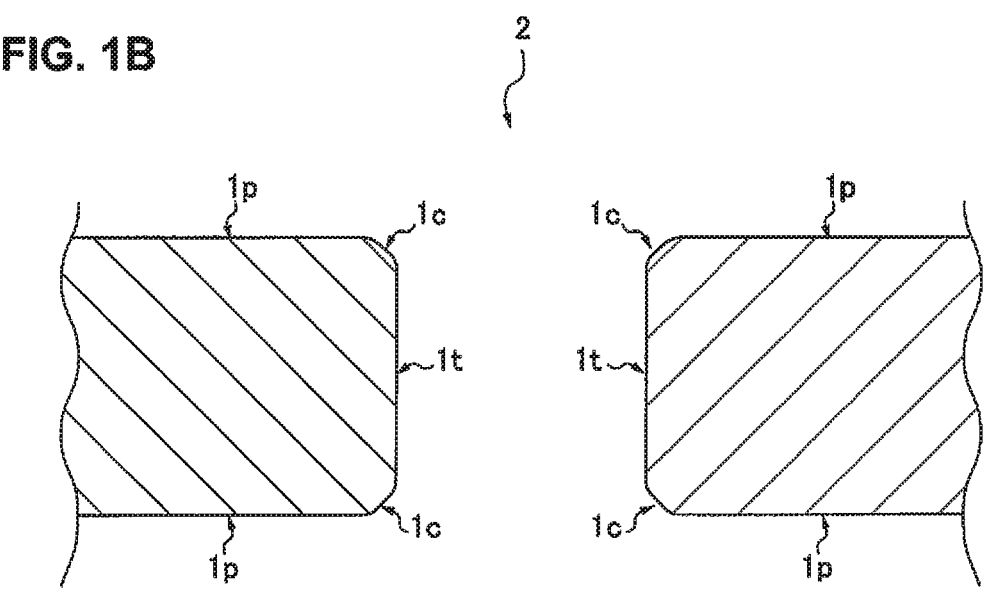
FIG. 1B is an enlarged cross-sectional view of an inner circumferential side edge portion of the magnetic-disk glass substrate of the present embodiment.

FIG. 1B is an enlarged cross-sectional view of an inner circumferential side edge portion of the magnetic-disk glass substrate 1 of the present embodiment. As shown in FIG. 1B, the magnetic-disk glass substrate 1 has a pair of main surfaces 1p, a side wall surface 1t arranged along a direction orthogonal to the pair of main surfaces 1p, and a pair of chamfered surfaces 1c arranged between the pair of main surfaces 1p and the side wall surface 1t. Although not shown, a side wall surface and chamfered surfaces are similarly formed for the outer circumferential side edge portion of the magnetic-disk glass substrate 1. It should be noted that the chamfered surface may be formed into a circular arc in cross-sectional view. The side wall surface and the chamfered surfaces are also correctively referred to as an "edge surface" in the following description. The inner circumferential edge surface is an inner circumferential edge surface, and the outer circumferential edge surface is an outer circumferential edge surface.

The magnetic-disk glass substrate 1 of the present embodiment is configured such that the roundness of an inner hole 2 of the glass substrate is 1.5 µm or less, and when outlines of the side wall surface 1t in the circumferential direction at a plurality of different positions in the substrate thickness direction including at least three positions spaced apart by 200 µm in the substrate thickness direction on the side wall surface 1t of the inner hole 2 are obtained, among inscribed circles of the respective outlines, a difference between the radius of the smallest inscribed circle and the radius of the largest inscribed circle is 3.5 µm or less. It should be noted that when the outlines of the side wall surface 1t in the circumferential direction at the plurality of different positions in the substrate thickness direction including at least three positions spaced apart by 200 µm in the substrate thickness direction on the side wall surface 1t of the inner hole 2 are respectively obtained, among the inscribed circles of the respective outlines, the difference between the radius of the smallest inscribed circle and the radius of the largest inscribed circle is referred to as the "shape evaluation value of the inner hole" or as merely the "shape evaluation value" hereinafter. As the shape evaluation value of the inner hole of the magnetic-disk glass substrate deceases, the inner hole of the magnetic disk, when formed from this glass substrate and mounted on the spindle, becomes less likely to locally abut against the spindle in the substrate thickness direction, or in other words, the side wall surface of the inner hole of the magnetic disk becomes more likely to come into surface contact with the spindle, and this is thought to work advantageously against distortion of the magnetic disk (that is, the magnetic disk is unlikely to become distorted) due to contact with the spindle.

It should be noted that the method for measuring roundness can be a known method. For example, as described above, a plate-shaped probe that is longer than the thickness of the glass substrate is inserted into the inner hole in the vertical direction with respect to the main surface of the glass substrate, an outline is obtained by scanning the inner hole in the circumferential direction, and thus a difference in the radius between an inscribed circle and a circumscribed circle of this outline can be calculated as the roundness of the glass substrate.

Figure 2A:
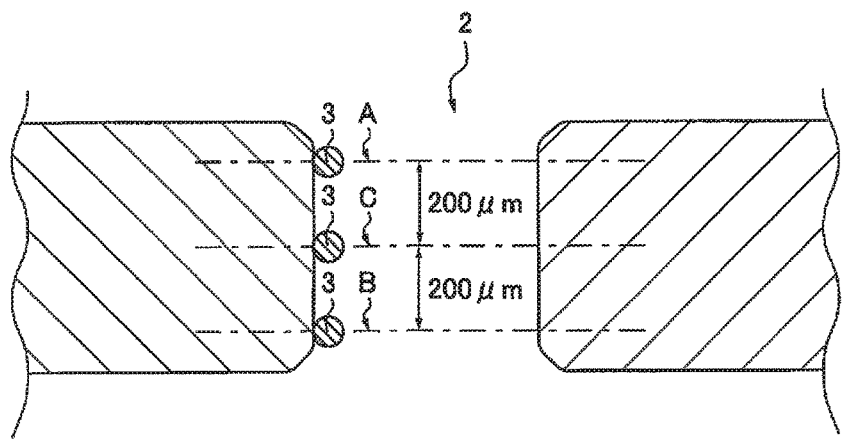
FIG. 2A is a diagram illustrating a method for measuring outlines of a side wall surface of the magnetic-disk glass substrate of the present embodiment.
Figure 2B:
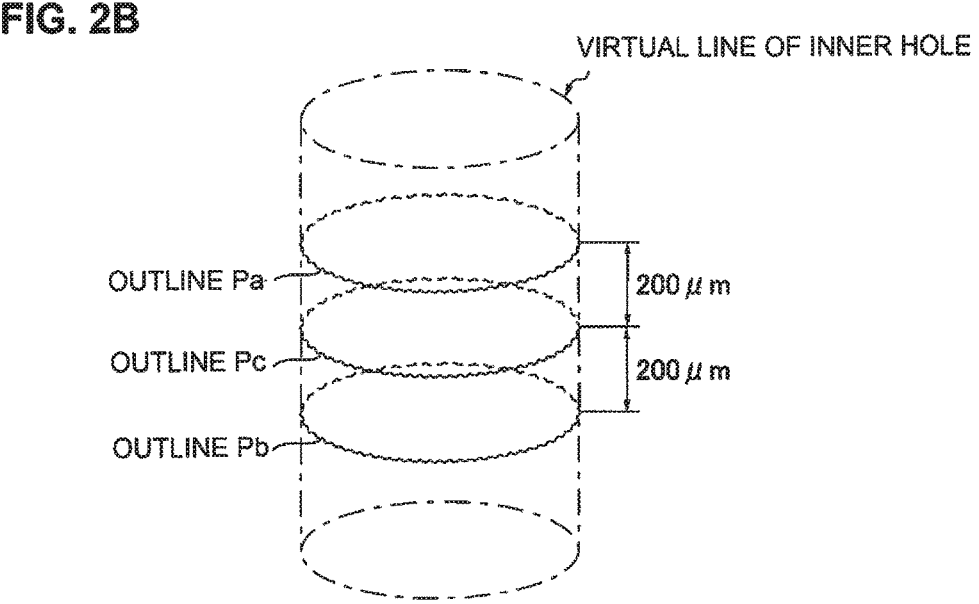
FIG. 2B is a diagram illustrating a method for measuring outlines of a side wall surface of the magnetic-disk glass substrate of the present embodiment.

The method for calculating a shape evaluation value of the inner hole of the magnetic-disk glass substrate will be described with reference to FIGS. 2A, 2B, and 3. FIGS. 2A and 2B are diagrams illustrating the method for measuring outlines of the side wall surface $1t$ of the magnetic-disk glass substrate 1 of the embodiment, and FIG. 3 is a diagram illustrating the method for calculating a shape evaluation value based on the outlines of the side wall surface $1t$ of the magnetic-disk glass substrate 1 of the embodiment.

Similarly to FIG. 1B, FIG. 2A is an enlarged cross-sectional view of the inner hole 2 of the magnetic-disk glass substrate 1 of the embodiment. In FIG. 2A, a central position C in the substrate thickness direction of the inner hole 2 of the magnetic-disk glass substrate 1, a position A upward from the central position C to one of the main surface sides by 200 μm, and a position B downward from the central position C to the other of the main surface sides by 200 μm are three examples of a plurality of positions (that is, measurement positions in the substrate thickness direction when referenced on either one of the main surfaces) at which the outline of the side wall surface $1t$ of the inner hole 2 is measured. These positions are favorable for a magnetic-disk glass substrate having a thickness of 0.8 mm or more, for example. It should be noted that in the case where the thickness is 0.635 mm or less or the measurement positions A and C used in the above-described method for determining measurement positions will miss the side wall surface due to the large chamfering amount or the like, the measurement positions A and C may be spaced apart from each other by 100 μm in the substrate thickness direction. A stylus 3 is set at these positions A to C to obtain the outlines of the inner hole 2. Accordingly, as shown in FIG. 2B, three outlines Pa to Pc are obtained at different heights of the inner hole in the substrate thickness direction. It should be noted that the stylus 3 preferably uses a small hole gauge head having a relatively small diameter with a radius of curvature of the tip of φ0.4 mm or less, for example, so that measurement can be performed at a plurality of positions in the substrate thickness direction. Also, although three measurement positions are shown as examples in FIGS. 2A and 2B, the number of measurement positions can be greater than 3.

In the magnetic-disk glass substrate 1 of the present embodiment, the roundness of the inner hole 2 is 1.5 μm or less. Also, the inscribed circles of the three outlines Pa to Pc are obtained, and a shape evaluation value of the inner hole 2 is measured as follows, based on the data of three inscribed circles (shown in FIG. 3). It should be noted that the centers of three inscribed circles are located at the same position.

Figure 3:
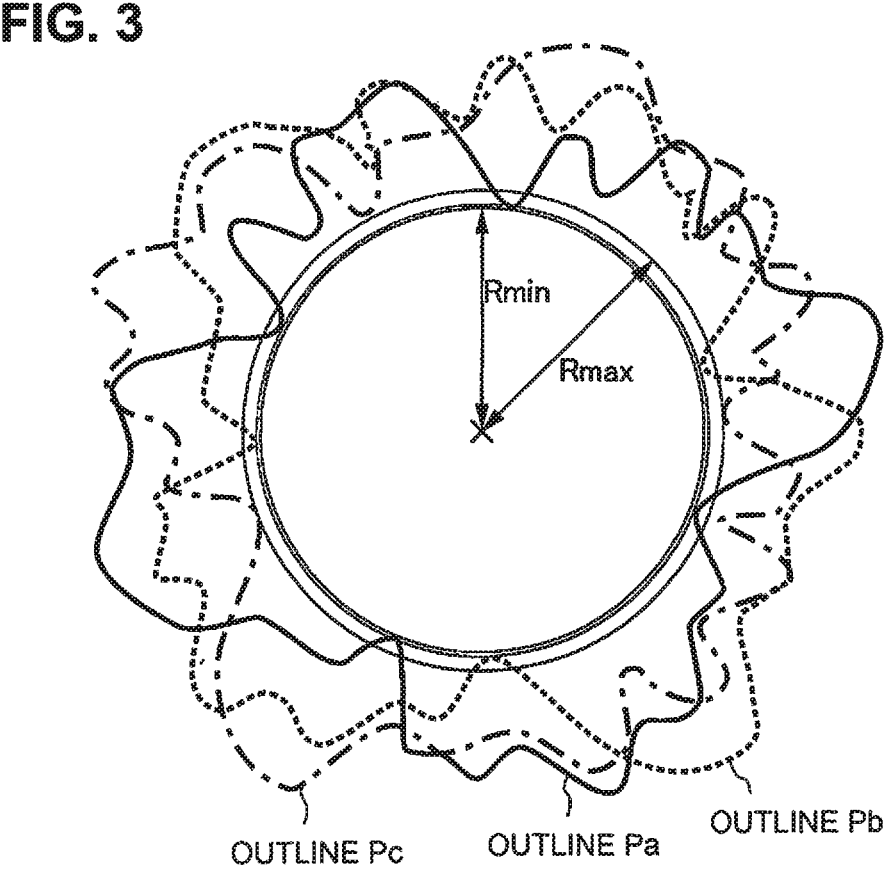
FIG. 3 is a diagram illustrating a method for calculating a shape evaluation value of an inner hole based on the outlines of the side wall surface of the magnetic-disk glass substrate of the present embodiment.

Referring to FIG. 3, first, radii of the inscribed circles of the three outlines Pa to Pc are derived. Next, a difference between a maximum value Rmax and a minimum value Rmin of the radii of the inscribed circles of the three outlines is derived, and the difference of the radii is used as a shape evaluation value of the inner hole 2. In the magnetic-disk glass substrate of the present embodiment, the shape evaluation value of the inner hole 2 is 3.5 μm or less, and more favorably 2.5 μm or less.

The surface roughness of the side wall surface $1t$ of the inner hole 2 (that is, on the inner circumferential side) preferably has a maximum height Rz of 0.2 μm or less and more preferably 0.1 μm or less. Also, the surface roughness thereof preferably has an arithmetic mean roughness Ra of 0.02 μm or less. Setting Rz and Ra in this range can prevent thermal asperity resulting from adherence or digging in of foreign substances and corrosion resulting from the deposition of ions such as sodium and potassium. Also, for similar reasons described above, it is also preferable that the surface roughness of the pair of chamfered surfaces $1c$ is in the above-described range. Here, Rz refers to the maximum height defined by JIS B 0601:2001. Ra refers to the arithmetic mean roughness defined by JIS B 0601:2001.

Also, with regard to the surface roughness of the side wall surface $1t$ of the inner hole 2, letting the maximum height in the substrate thickness direction be Rz(t) and the maximum height in the circumferential direction be Rz(c), Rz(t)/Rz(c) is preferably 1.2 or less, and even more preferably 1.1 or less. If Rz(t)/Rz(c) exceeds the above-described range, variation in the shape evaluation value of substrates is likely to increase at the time of mass production. By setting Rz(t)/Rz(c) to a value in the above-described range, it is possible to reduce variation in the shape evaluation value.

It should be noted that the value of surface roughness can be obtained by measuring the side wall surface $1t$ with a wavelength bandwidth in which the surface roughness is measured using a laser microscope set from 0.25 μm to 80 μm, for example, and selecting and analyzing a region of 50 μm square in the measured range. The surface roughness in the substrate thickness direction and the circumferential direction can take an average value of data obtained by measuring the line roughness of the region of 50 μm square, for example, from a plurality of cross-sections respectively corresponding in the substrate thickness direction and the circumferential direction. For example, it is sufficient that five sets of data are obtained and the average thereof is used as the surface roughness.

Next, a preferable shape of a portion between the side wall surface $1t$ and the chamfered surface $1c$ will be described.

Figure 4:
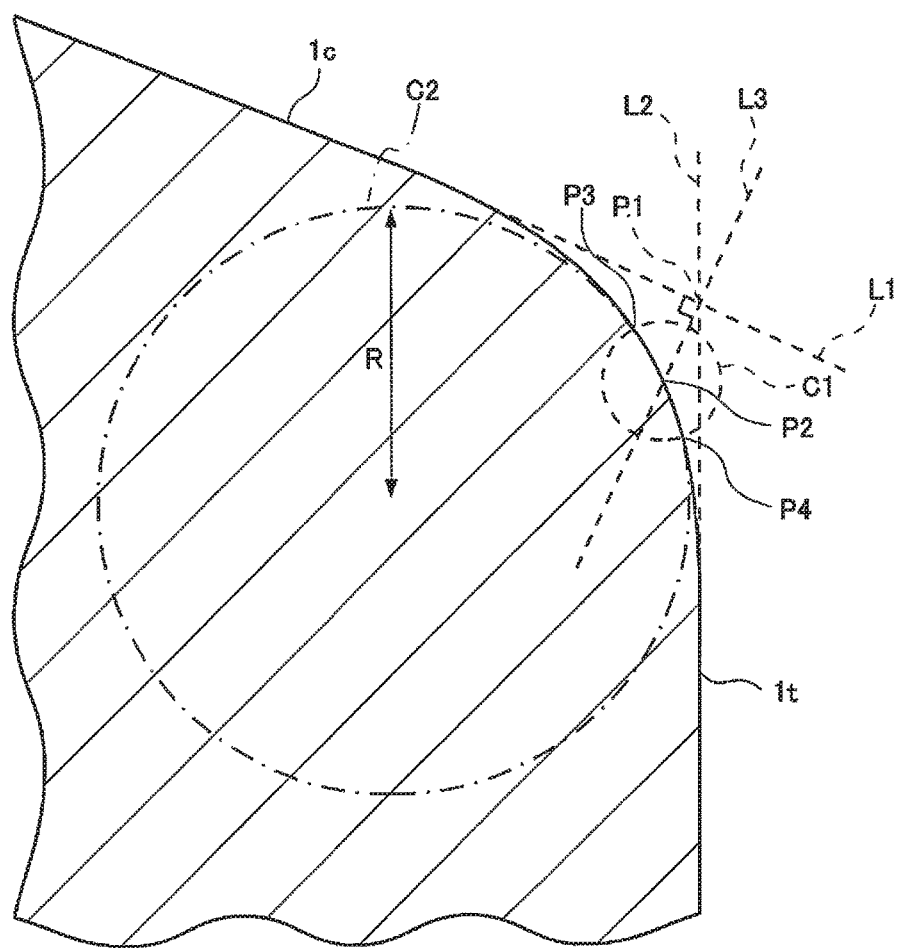
FIG. 4 is an enlarged view of a portion of an inner circumferential cross-section of FIG. 1.

First, a method for deriving the radius of curvature of the shape of a portion between the side wall surface $1t$ and the chamfered surface $1c$ will be described with reference to FIG. 4. In FIG. 4, R is a radius of a circle C2 forming the curvature of the shape of the portion between the side wall surface $1t$ and the chamfered surface $1c$, and is the radius of curvature of the shape of the portion. The radius of curvature R is derived as follows, for example. First, an intersection point of a virtual line L1 obtained by extending a linear portion of the chamfered surface $1c$ and a virtual line L2 obtained by extending a linear portion of the side wall surface $1t$ is denoted by P1. Next, a virtual line L3 passing through the intersection point P1 and extending perpendicular to the linear portion of the chamfered surface $1c$ is set. Next, an intersection point of the virtual line L3 and the portion between the side wall surface $1t$ and the chamfered surface $1c$ is denoted by P2. Also, a circle C1 having a predetermined radius (50 μm, for example) around the intersection point P2 is set on the cross-section of the magnetic-disk glass substrate 1. Also, two intersection points of an outer circumference of the circle C1 and the portion between the side wall surface 1t and the chamfered surface 1c are respectively denoted by P3 and P4. Furthermore, a circle C2 respectively passing through three intersection points P2, P3, and P4 are set. By deriving the radius of the circle C2, the radius of curvature R of the shape of the portion between the side wall surface 1t and the chamfered surface 1c can then be derived.

It should be noted that the radii of curvature of shapes of both portions between the side wall surface 1t and the chamfered surface 1c adjacent to one main surface 1p and between the side wall surface 1t and the chamfered surface 1c adjacent to the other main surface 1p can also be derived as described above.

In the present embodiment, a measurement point is provided every 30 degrees in the circumferential direction, referenced on the center of the magnetic-disk glass substrate 1. In other words, the number of measurement points is 12. When the radius of curvature R of the shape of the portion between the side wall surface 1t and the chamfered surface 1c is derived at each measurement point, it is preferable that a difference in the radius of curvature R between adjacent measurement points is set to 0.01 mm or less. Accordingly, it is possible to reduce a change in the shape of the inner circumferential edge surface in the circumferential direction of the magnetic-disk glass substrate 1, and reduce variation in the shape evaluation value of the inner hole 2. It should be noted that the difference in the radius of curvature R between adjacent measurement points is more preferably 0.005 mm or less, because variation in the shape evaluation value of the inner hole 2 can be further reduced.

On the main surface of the magnetic-disk glass substrate 1, a region including locations at which a magnetic disk is clamped by a clamping member when the magnetic disk produced based on the magnetic-disk glass substrate 1 is fixed to the HDD is referred to as a "clamp region". The clamp region has a diameter that is 128% of the diameter of the circular hole on the main surface, and is an annular region on the central portion side of the circumference of a concentric circle with the circular hole. It is preferable that the clamp region has a flatness of 1 μm or less.

The flatness of such a clamp region is expressed by TIR (Total Indicated Runout) value, which is a difference between a height of the maximum peak and a depth of the maximum valley. Measurement of flatness can be performed using an interference flatness measurement device through phase-measurement interferometry (phase shifting) at a predetermined measurement wavelength, for example. Specifically, it is sufficient that the flatness of the clamp region of both main surfaces of the glass substrate is measured using a light source having a measurement wavelength of 680 nm through phase-measurement interferometry (phase shifting). It should be noted that it is sufficient that the flatness is measured in the clamp region of both main surfaces and a higher value is used as the measured flatness of the glass substrate.

On the main surface of the glass substrate, if the flatness is low at a location where the magnetic disk is clamped and fixed by the clamping member, the shape of the glass substrate slightly deforms when the magnetic disk is clamped using the clamping member, as a result of which the overall flatness of the magnetic disk may be deteriorated. As a result, there are cases where fluttering is deteriorated. Thus, as described above, it is preferable that the flatness of the clamp region is 1 μm or less.

In the case where a magnetic disk in which a magnetic layer is formed on the main surface of the magnetic-disk glass substrate of the present embodiment is produced and integrated into the spindle of a HDD, the roundness and the shape evaluation value of the inner hole of the magnetic disk are extremely small. Therefore, distortion of the magnetic disk resulting from the side wall surface of the magnetic disk on the inner hole side locally abutting against the spindle is unlikely to occur. For example, in the case where the coefficient of thermal expansion of the glass substrate is smaller than that of the spindle and the HDD is placed in a high temperature atmosphere, even in a case where the spindle expands relatively largely with respect to the glass substrate, the entire side wall surface of the magnetic disk on the inner hole side comes into contact with the spindle, and therefore the above-described distortion is unlikely to occur. Thus, when the magnetic disk of the HDD is rotated at high speed, the level of fluttering is unlikely to increase. Although the coefficient of thermal expansion of the spindle is about 90 to $100 \times 10^{-7}$ [$K^{-1}$] or more, for example, the magnetic-disk glass substrate of the present embodiment is favorable in the case in which a difference in the coefficient of thermal expansion between the spindle and the glass substrate increases. In particular, the magnetic-disk glass substrate of the present embodiment is favorable in the case of a magnetic-disk glass substrate having a coefficient of thermal expansion of $60 \times 10^{-7}$ [$K^{-1}$] or less or the like to be used for a magnetic disk for energy-assisted magnetic recording.

When a magnetic disk on which a magnetic layer having a track recording density of 500 kTPI (tracks per inch) or more, in particular, is formed is integrated into the HDD, such as a magnetic disk for energy-assisted magnetic recording, there are cases where accuracy in positioning the magnetic head at the data track of the HDD deteriorates due to slight distortion in the magnetic disk, and thus the magnetic-disk glass substrate of the present embodiment is favorable for a magnetic disk provided with the above-described high recording density.

[Method for Manufacturing Magnetic-Disk Glass Substrate]

Hereinafter, a method for manufacturing the magnetic-disk glass substrate of the present embodiment will be described step-by-step. It should be noted that the order of the steps may be changed as appropriate.

(1) Glass Substrate Formation

A raw glass plate is molded by press molding and processes are appropriately performed to form an inner hole and an outer shape to obtain an annular glass substrate having an inner hole that has a predetermined thickness, for example. It should be noted that the method for molding a raw glass substrate is not limited to these methods and a glass substrate can also be manufactured by a known manufacturing method such as a float method, a down draw method, a redraw method, or a fusion method.

(2) Edge Surface Grinding Step

Next, the edge surfaces of the annular glass substrate are ground. The edge surfaces of the glass substrate are ground in order to form chamfered surfaces at the outer circumferential side edge portion and the inner circumferential side edge portion of the glass substrate, and adjust the outer and inner diameter of the glass substrate. The grinding processing performed on the outer circumferential side edge surface of the glass substrate may be known chamfering processing with a formed grindstone using diamond abrasive particles, for example.

The inner circumferential side edge surface of the glass substrate is ground using a formed grindstone and by additional grinding processing in which a grindstone is brought into contact with the edge surface of the glass substrate such that a locus of the grindstone that is in contact with the edge surface of the glass substrate is not constant. Hereinafter, the additional grinding processing on the inner circumferential side edge surface of the glass substrate will be described with reference to FIG. 5.

Figure 5:
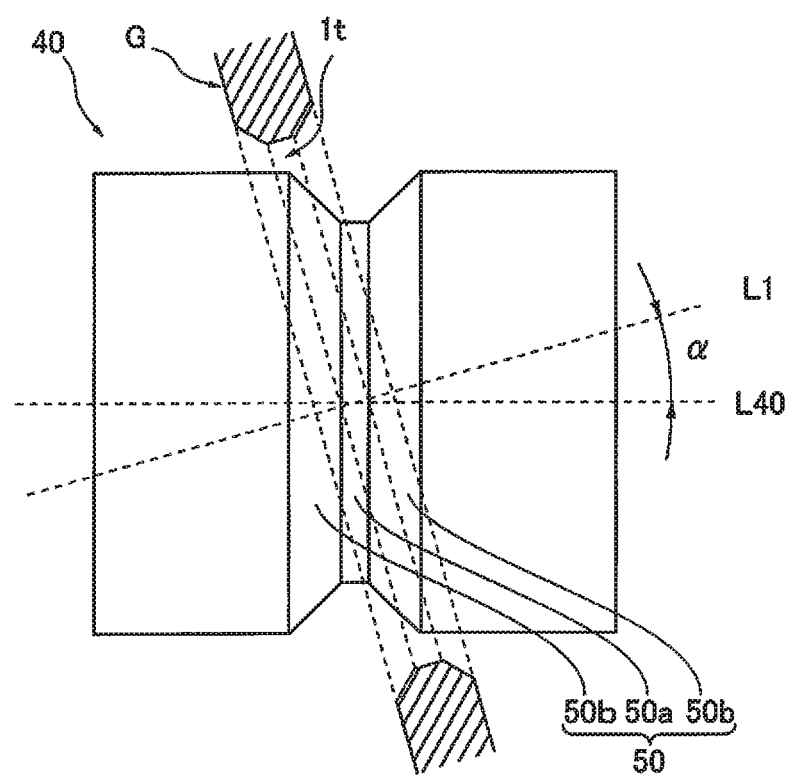
FIG. 5 is a diagram illustrating a method for polishing an edge portion of a glass substrate in an embodiment.

FIG. 5 is a diagram showing a method for processing the inner circumferential side edge surface of the glass substrate.

As shown in FIG. 5, a grindstone 40 used to grind the inner circumferential side edge surface of the glass substrate G is formed in a cylindrical shape as a whole and has a groove 50. The groove 50 is formed so as to be capable of simultaneously grinding both the side wall surface 1$t$ and the chamfered surface 1$c$ of the glass substrate G on the inner circumferential side. Specifically, the groove 50 has a groove shape including a side wall portion 50$a$ and chamfering portions 50$b$ located on both sides of the side wall portion 50$a$. The side wall portion 50$a$ and the chamfering portions 50$b$ of the groove 50 described above are formed so as to have predetermined dimensions and shapes in consideration of the finishing target dimensions and shapes of the ground surfaces of the glass substrate G.

In the processing of the inner circumferential side edge surface of the glass substrate, the grinding processing is performed by rotating both the glass substrate G and the grindstone 40 while bringing the grindstone 40 into contact with the inner circumferential side edge surface 1$t$ of the glass substrate G in a state in which the glass substrate G is inclined with respect to the groove direction of the groove 50 formed in the grindstone 40, that is, in a state in which a rotation axis $L_1$ of the glass substrate G is inclined by an angle $\alpha$ (in FIG. 5, $\alpha$ is a positive counterclockwise angle) with respect to a rotation axis $L_{40}$ of the grindstone 40. Accordingly, the locus of the grindstone 40 that abuts against the inner circumferential side edge surface of the glass substrate G is not constant, and the abrasive particles of the grindstone 40 abut against and act on the edge surface of the substrate at random positions. Therefore, since impairment of the substrate is reduced, the surface roughness of the ground surface is reduced, and in-plane variation is reduced, it is possible to make the ground surface smoother, that is, to finish the ground surface with a quality of a level that meets the requirement for higher quality. Furthermore, the effect of improving the life of the grindstone is obtained.

Moreover, as shown in FIG. 5, the grindstone 40 and the glass substrate G are in contact with each other in a state in which the groove 50 of the grindstone 40 and an inner diameter arc of the glass substrate G are in contact with each other in a surface contact state, thus increasing a contact area between the grindstone 40 and the glass substrate G. Therefore, a contact length (cutting blade length) of the grindstone 40 with respect to the glass substrate G is extended, thus making it possible to maintain the sharpness of the abrasive particles. Accordingly, stable grinding performance can be secured even in the case where the grinding processing is performed using a grindstone with fine abrasive particles that is advantageous in terms of the quality of the ground surface, and the favorable quality of the ground surface (mirror surface quality) can be stably obtained by grinding processing mainly using a plastic mode. In addition, the sharpness of the grindstone is maintained and the grinding performance for achieving the plastic mode is stably secured, thus making it possible to secure the favorable accuracy of dimensions and shapes obtained by chamfering processing performed on the inner circumferential edge surface of the glass substrate.

Although the inclination angle $\alpha$ of the glass substrate G with respect to the groove direction of the grindstone 40 described above can be set arbitrarily, it is preferable that the inclination angle $\alpha$ is in a range of one to fifteen degrees in order to more favorably exhibit the operations and effects described above. It is preferable that the grindstone 40 used in the grinding processing is a grindstone obtained by binding diamond abrasive particles with resin (resin bond grindstone). It is preferable to use a 2000# to 3000# diamond grindstone.

A preferable example of the circumferential speed of the grindstone 40 is 500 to 3000 in/minute, and the circumferential speed of the glass substrate G is about 1 to 30 m/minute. In addition, it is preferable that the ratio (circumferential speed ratio) of the circumferential speed of the grindstone 40 to the circumferential speed of the glass substrate G is in a range of 50 to 300.

It should be noted that the above-described grinding step can be divided into two steps, and first grinding is performed in a state in which the rotation axis of the glass substrate G is inclined by an angle $\alpha$ ($\alpha$>0), as described above, second grinding is performed in a state in which the rotation axis of the glass substrate G is inclined by an angle $-\alpha$ using another grindstone, and adjustment is performed such that the machining allowance of the second grinding is smaller than the machining allowance of the first grinding, as a result of which Rz(t)/Rz(c) can be 1.2 or less.

It is preferable that the hardness (referred to as "grindstone hardness" hereinafter) obtained by measuring a binder (resin) portion on the grindstone surface of the above-described resin bond grindstone using a Berkovich indenter under conditions where an indentation load is 250 mN by a nanoindentation test method is in a range of 0.4 to 1.7 GPa. In the case of the resin bond grindstone, the grindstone hardness is an index that is correlated with a bond strength between the diamond abrasive particles and the resin.

As a result of grinding the inner circumferential side edge surface using resin bond grindstones having various characteristics and observing the processed quality of the edge surface of the glass substrate, the inventors of the present invention found that the bond strength between the diamond abrasive particles and the resin in the resin bond grindstone had a large influence on the shape evaluation value of the inner hole of the glass substrate subjected to the above-described grinding processing. That is, it was found that if the inner circumferential side edge surface is ground using a resin bond grindstone having a grindstone hardness that is too high, the processing rate is favorable but the surface is likely to be blemished and the shape evaluation value of the inner hole is deteriorated, whereas if the inner circumferential side edge surface is ground using a resin bond grindstone having a grindstone hardness that is too low, the shape evaluation value of the inner hole is favorable but the processing rate decreases markedly. In other words, the shape evaluation value of the inner hole of the glass substrate can be adjusted by changing the grindstone hardness. As a result, it was found that the grindstone hardness was preferably in the above-described range. By setting the grindstone hardness in the above-described range, it is possible to process the inner circumferential side edge surface subjected to the grinding processing to a semi-mirror surface, and therefore, the machining allowance can be reduced in a subsequent edge surface polishing step, thus making it possible to improve the shape accuracy of the edge portion including the shape evaluation value of the inner hole while maintaining high surface quality.

A method for measuring grindstone hardness by a nanoindentation test method will be described. A load is applied at 1 nm/sec to a binder portion of the grindstone surface, which is the measurement target, using a Berkovich indenter having a quadrangular pyramidal tip, the pressure is increased to 250 mN and held for a predetermined time (10 seconds, for example), and then a relationship between the load and the displacement when the pressure is reduced at an unloading rate equivalent to when the pressure was increased is obtained. A curve obtained here indicates dynamic hardness, which is a characteristic closer to actual use conditions than evaluation of hardness, which is a conventional static hardness characteristic. Based on the result of the obtained curve of dynamic hardness characteristics, grindstone hardness can be obtained by the nanoindentation test method using Equation (1) below.

$$H = F/Ac \quad (1)$$

where H is the hardness of the grindstone, F is a load, and Ac is an indentation area.

The above-described indentation area Ac is expressed by relational expressions (2) and (3) below.

$$Ac = f(hc) \propto 24.5 \cdot hc^2 \quad (2)$$

$$hc = h\max - \varepsilon \cdot F/S \quad (3)$$

where hc is an indentation depth, hmax is a depth at maximum load, hs is an indentation depth at the start of unloading, ho is an indentation depth after unloading, $\varepsilon$ is a shape coefficient specific to the indenter (example: in case of a Berkovich indenter=0.75), S is a proportionality coefficient of the load and displacement, and m is a slope (dF/dh).

(3) Edge Surface Polishing Step

Next, the edge surfaces of the annular glass substrate are polished. The edge surfaces of the glass substrate are polished in order to improve the properties of the outer circumferential side edge surface and the inner circumferential side edge surface (side wall surface and chamfered surfaces) of the glass substrate. In the edge surface polishing step, the outer circumferential side edge surface and the inner circumferential side edge surface of the glass substrate are polished by brushing.

By performing the edge surface grinding and the edge surface polishing described above, contamination by attached waste and the like and impairment such as scratches on the edge surface of the glass substrate can be eliminated, thermal asperity and deposition of ions such as sodium and potassium that causes corrosion can be prevented, and surface roughness and waviness can also be significantly reduced and the shape evaluation value of the inner hole of the glass substrate can be reduced, thus making it possible to improve the shape accuracy of the edge portion of the inner hole.

(4) First Polishing (Main Surface Polishing) Step

After the main surface grinding step is appropriately performed as required, first polishing is performed on the ground main surfaces of the glass substrate. The first polishing is performed in order to eliminate scratches and distortions that remain on the main surfaces due to the main surface grinding or the like and to adjust surface unevenness (microwaviness, roughness).

In the first polishing step, the main surfaces of the glass substrate are polished using a double-side polishing device provided with a planetary gear mechanism. The double-side polishing device has an upper surface plate and a lower surface plate. Planar polishing pads (resin polishers) are attached to the upper surface of the lower surface plate and the bottom surface of the upper surface plate. One or more glass substrates accommodated in a carrier are held between the upper surface plate and the lower surface plate, and the glass substrate and the surface plates are moved relative to each other by the planetary gear mechanism moving one or both of the upper surface plate and the lower surface plate while supplying loose abrasive particles including an abrasive, so that the two main surfaces of the glass substrate can be polished.

During the relative motion described above, the upper surface plate is pressed against the glass substrate (that is, in a vertical direction) with a predetermined load, the polishing pads are pressed against the glass substrate, and a polishing liquid is supplied between the glass substrate and the polishing pads. The main surfaces of the glass substrate are polished by the abrasive contained in this polishing liquid. Known abrasive particles such as Cerium oxide, zirconium oxide, and silicon dioxide can be used as the abrasive, for example. It should be noted that this step may be divided into a plurality of steps changing the type or size of the abrasive particles.

(5) Chemical Strengthening Step

Furthermore, as required, the glass substrate may be chemically strengthened. A molten liquid of mixed salts of potassium nitrate and sodium nitrate, for example, can be used as a chemical strengthening liquid. Chemical strengthening processing is performed by immersing the glass substrate in the chemical strengthening liquid, for example. In this manner, by immersing the glass substrate in the chemical strengthening liquid, lithium ions and sodium ions in the surface layer of the glass substrate are respectively substituted with sodium ions and potassium ions with a relatively large ion radius in the chemical strengthening liquid, and the glass substrate is strengthened.

(6) Second Polishing (Final Polishing) Step

Next, second polishing is performed on the glass substrate. The second polishing is performed in order to mirror polish the main surfaces. In the second polishing, a polishing device used in the first polishing is used, for example. In this case, the second polishing differs from the first polishing in the type and size of loose abrasive particles and the hardness of the resin polisher.

Microparticles (particle size: diameter of about 10 to 100 m) of colloidal silica or the like suspended in a slurry, for example, are used as the loose abrasive particles to be used in the second polishing. This makes it possible to further reduce the surface roughness of the main surfaces of the glass substrate and to adjust the shape of the edge portion in a preferable range. The polished glass substrate is cleaned to provide a magnetic-disk glass substrate.

[Magnetic Disk]

A magnetic disk can be obtained as follows using the magnetic-disk glass substrate. A magnetic disk has a configuration in which at least an adherent layer, a base layer, a magnetic layer (magnetic recording layer), a protecting layer and a lubricant layer are laminated on the main surface of the magnetic-disk glass substrate (referred to as merely "substrate" hereinafter) in this order from the main surface side, for example.

For example, the substrate is introduced into a film deposition device that has been evacuated and the layers from the adherent layer to the magnetic layer are sequentially formed on the main surface of the substrate in an Ar atmosphere by a DC magnetron sputtering method. CrTi can be used in the adherent layer and CrRu can be used in the base layer, for example. A CoPt-based alloy can be used in the magnetic layer, for example. Also, a CoPt-based alloy or a FePt-based alloy having an $L_{10}$ ordered structure is formed as the magnetic layer for thermally assisted magnetic recording. After the film deposition as described above, by forming the protecting layer using $C_2H_4$ by a CVD method, for example, and subsequently performing nitriding processing that introduces nitrogen to the surface, a magnetic recording medium can be formed. Thereafter, by coating the protecting layer with perfluoropolyether (PFPE) by a dip coat method, the lubricant layer can be formed.

The produced magnetic disk is preferably incorporated in a magnetic-disk drive device (hard disk drive (HDD)) serving as a magnetic recording and reproduction device provided with a magnetic head equipped with a dynamic flying height (DFH) control mechanism and a spindle for fixing the magnetic disk.

Working Examples and Comparative Examples

In order to confirm the effect of the magnetic-disk glass substrate of the present embodiment, 2.5-inch magnetic disks (having an outer diameter of 65 mm, an inner diameter of 20 mm, and a thickness of 0.8 mm, a length of a side wall surface on the inner diameter side of 0.5 mm, and an angle of the chamfered surface of 45 degrees with respect to the main surface) were produced using manufactured magnetic-disk glass substrates. The glass composition of the produced magnetic-disk glass substrate was as follows.
(Glass Composition)

Amorphous aluminosilicate glass was used that contained $SiO_2$ in an amount of 63 mol %, $Al_2O_3$ in an amount of 10 mol %, $Li_2O$ in an amount of 1 mol %, $Na_2O$ in an amount of 6 mol %, MgO in an amount of 19 mol %, CaO in an amount of 0 mol %, SrO in an amount of 0 mol %, BaO in an amount of 0 mol %, and $ZrO_2$ in an amount of 1 mol %.

It should be noted that the molar ratio of the content of CaO to the total content of MgO, CaO, SrO and BaO (CaO/(MgO+CaO+SrO+BaO)) was zero, and the glass-transition temperature was 703° C. The coefficient of thermal expansion of the glass material having this composition was $56 \times 10^{-7}$ [$K^{-1}$].

[Production of Magnetic-Disk Glass Substrates of Working Examples and Comparative Examples]

The magnetic-disk glass substrates of working examples were produced by performing the steps of the method for manufacturing a magnetic-disk glass substrate according to the present embodiment in the given order. Here, the press molding method was used in molding of the glass substrate, and an inner diameter and an outer shape were formed, and the thickness was adjusted using a known method.

In the edge surface grinding step, the inner circumferential edge surface and the outer circumferential edge surface of the glass substrate were chamfered and the inner circumferential side wall surface and the outer circumferential side wall surface were ground with a formed grindstone using diamond abrasive particles to form chamfered surfaces and a side wall surface. Furthermore, with regard to the inner circumferential side edge surface of the glass substrate, by adding grinding processing in which the edge surface of the glass substrate is inclined and brought into contact with the grindstone such that the locus of the grindstone abutting against the edge surface of the glass substrate was not constant, surface quality was further improved while increasing the shape accuracy of the chamfered surfaces and the side wall surface.

In the additional grinding processing performed on the inner circumferential side edge surface of the glass substrate, a resin bond grindstone with 2500# diamond abrasive particles was used, and the inclination angle ($\alpha$ in FIG. 5) of the glass substrate with respect to the groove direction of the grindstone was set to 5 degrees. Other conditions were adjusted as appropriate. In this case, glass substrates that were different in the shape evaluation value of the inner hole were produced by adjusting the inclination angle ($\alpha$ in FIG. 5) of the glass substrate with respect to the groove direction of the grindstone and the other factors (e.g., grit of the grindstone, and circumferential speed of the grindstone or the glass substrate) in the above-described range as appropriate. It should be noted that although in the case of a working example 1 in Table 1, $\alpha=5$ degrees, by further increasing the inclination angle, the surface quality is improved after grinding, and thus it is possible to further improve the shape evaluation value.

It should be noted that in case of the working example 1 of Table 1, a resin bond grindstone having a grindstone hardness of 1.05 GPa was used to perform edge surface grinding.

In the edge surface polishing step, the brushing was performed on the inner circumferential side edge surface and the outer circumferential side edge surface of the glass substrate, using a slurry containing cerium oxide abrasive particles as polishing abrasive particles. It should be noted that the machining allowance for a chamfered surface in the edge surface polishing was adjusted in accordance with the surface quality after the edge surface grinding step as appropriate.

Thereafter, grinding was performed on the main surface using a known method, and then two-step polishing and chemical strengthening were performed thereon. A polishing liquid containing cerium oxide abrasive particles was used in the first polishing, and a polishing liquid containing colloidal silica polishing abrasive particles was used in the second polishing. The chemical strengthening was performed before the second polishing. The glass substrate on which polishing has been performed was cleaned using a known cleaning method as appropriate. Accordingly, the magnetic-disk glass substrate was obtained.

Through the above steps, samples of the magnetic-disk glass substrates of the working examples and comparative examples were produced as shown in Table 1. As shown in Table 1, the magnetic-disk glass substrates of the working examples and comparative examples were different from each other in the shape evaluation value of the inner hole. As described above, the glass substrates that are different in the shape evaluation value of the inner hole were produced mainly by adjusting the inclination angle of the glass substrate with respect to the groove direction of a grindstone used in the grinding processing performed on the inner circumferential side edge surface of the glass substrate as appropriate. Although not shown in each table below, the roundness of the samples of the working examples and comparative examples was 1.5 μm or less.

It should be noted that a plate-shaped probe that was longer than the thickness of the produced magnetic-disk glass substrate was inserted into the inner hole in the vertical direction with respect to the main surface of the glass substrate, an outline was obtained by scanning the inner hole in the circumferential direction, and thus the roundness of the inner hole of the magnetic-disk glass substrate was calculated as a difference in the radius between an inscribed circle and a circumscribed circle of this outline. The shape evaluation value of the inner hole was calculated based on three outlines obtained at positions shown in FIG. 2A. That is, outlines were obtained at the central position of the inner hole in the substrate thickness direction and the positions spaced apart upward and downward by 200 μm from the central position, and among the inscribed circles of the three outlines, the difference between the radius of the smallest inscribed circle and the radius of the largest inscribed circle was used as the shape evaluation value of the inner hole. All measurements were performed using a roundness/cylindrical shape measurement machine.

[Evaluation Method]

Next, the samples of the magnetic-disk glass substrates of the working examples and comparative examples were formed into films as described above to produce samples of magnetic disks of working examples and comparative examples. Fluttering was evaluated by measuring fluttering characteristic values of the samples of the magnetic disks of the comparative examples and the working examples using a laser Doppler vibrometer. In the measurement of the fluttering characteristic value, a magnetic disk was mounted on the spindle of a 2.5-inch type HDD and was rotated, and the main surface of the rotating magnetic disk was irradiated with a laser beam from a laser Doppler vibrometer. It should be noted that the cover of the HDD was provided with a hole for laser beam irradiation. Next, the laser Doppler vibrometer received the laser beam reflected by the magnetic disk, and thus the amount of vibration in the thickness direction of the magnetic disk was measured as a fluttering characteristic value. In this case, the fluttering characteristic values were measured under the following conditions.

Environment for HDD and measurement system: The temperature was kept at 80° C. in a constant temperature and humidity chamber.

Rotation rate of magnetic disk: 7200 rpm

Laser beam irradiation position: Position 31 mm apart from the center (1.5 mm apart from the outer circumferential edge) of a magnetic disk in the radial direction

[Evaluation Criterion]

As described below, the results of evaluation of the measured fluttering characteristic values were divided to four levels 1 to 4 in descending order of favorability (that is, in increasing order of the fluttering characteristic value). Levels 1 and 2 are acceptable for practical purposes for a HDD of 500 kTPI.

Level 1: 20 nm or less
Level 2: more than 20 nm to 30 nm or less
Level 3: more than 30 nm to 40 nm or less
Level 4: more than 40 nm

TABLE 1

| | Shape evaluation value of inner hole (μm) | Fluttering characteristic value |
|---|---|---|
| Comp. Ex. 1 | 5.7 | Level 4 |
| Comp. Ex. 2 | 4.0 | Level 3 |
| Work. Ex. 1 | 3.5 | Level 2 |
| Work. Ex. 2 | 2.8 | Level 2 |
| Work. Ex. 3 | 2.5 | Level 1 |
| Work. Ex. 4 | 1.9 | Level 1 |

As shown in the comparative examples 1 and 2 of Table 1, in the case where the shape evaluation value of the inner hole was not sufficiently small even with a magnetic-disk glass substrate in which the roundness of the inner hole was favorable, fluttering characteristics were not favorable. It is conceivable that this is because the magnetic disk slightly distorted due to the side wall surface of the magnetic disk on the inner hole side locally abutting against the spindle. On the other hand, as shown in the working examples 1 to 4 of Table 1, in the case where both the roundness of the inner hole and the shape evaluation value were 3.5 μm or less, the fluttering characteristics of the HDD were favorable. It is conceivable that this is because the magnetic disk did not distort, due to surface contact between the side wall surface of the magnetic disk on the inner hole side and the spindle, even in a high temperature atmosphere in which a gap between the inner hole of the magnetic disk and the spindle was reduced. It should be noted that as shown in the working examples 3 and 4 of Table. 1, in the case where the shape evaluation value of the inner hole of the magnetic disk was 2.5 μm or less, it was confirmed that fluttering characteristics were further improved. As shown in the working examples 1 to 4, it is conceivable that in the case where fluttering characteristics were favorable, an error was unlikely to occur when a magnetic signal was written to or read out from the magnetic disk of the HDD, positioning accuracy by the servo of the HDD was favorable.

It should be noted that when a magnetic-disk glass substrate having a roundness of 1.8 μm and a shape evaluation value of 3.5 μm or 2.5 μm (respectively, comparative examples 3 and 4) were prepared and fluttering characteristic values were measured using the glass substrate, each value was level 4. According to this, it was found that even in the case where the shape evaluation value was 3.5 μm or less, if the roundness exceeded 1.5 μm, the level of fluttering was not improved.

Next, ten magnetic-disk glass substrates of the working example 1 described above and ten magnetic-disk glass substrates of the working examples 5 and 6 were produced, and Rz, Ra, an average value of Rz(t)/Rz(c), and variation in the shape evaluation value were derived. Rz of each glass substrate was 0.2 μm or less. Also, Ra of each glass substrate was 0.02 μm or less. The magnetic-disk glass substrates of the working examples 5 and 6 were produced under the production conditions of the working example 1 except that only the edge surface grinding step was different. Specifically, in the working examples 5 and 6, in the edge surface grinding step, the first grinding was performed such that the inclination angle (α in FIG. 5) of the glass substrate with respect to the groove direction of the grindstone was 5 degrees, the second grinding was then performed such that the inclination angle of the glass substrate was −5 degrees using another grindstone, and adjustment was performed such that the machining allowance of the second grinding was smaller than the machining allowance of the first grinding. The evaluation results of the working examples 1, 5, and 6 were shown in Table 2. In Table 2, the average value of Rz(t)/Rz(c) is the average value of Rz(t)/Rz(c) of the ten magnetic-disk glass substrates, and "variation in the shape evaluation value" is a difference between the maximum value and the minimum value of shape evaluation values of the ten magnetic-disk glass substrates.

It could be found from Table 2 that Rz(t)/Rz(c) was 1.2 or less, and thus variation in the shape evaluation value decreased. Also, it could be found that if Rz(t)/Rz(c) was 1.1 or less, variation in the shape evaluation value further decreased.

TABLE 2

| | Average value of Rz(t)/Rz(c) | Variation in shape evaluation value (μm) |
|---|---|---|
| Work. Ex. 1 | 1.31 | 0.5 |
| Work. Ex. 5 | 1.17 | 0.3 |
| Work. Ex. 6 | 1.08 | 0.2 |

Next, ten samples (working examples 7 and 8) were produced under the production conditions of the working example 1 except that the machining allowance of the edge surface grinding was changed, and variation in the shape evaluation value of the working examples 7 and 8 was derived. Similarly to those shown in Table 2, variation in the shape evaluation value is a difference between the maximum value and the minimum value of shape evaluation values of the ten samples.

Also, with regard to the working examples 1, 7, and 8, the radius of curvature of a portion between the side wall surface and the chamfered surface of the inner circumferential edge portion was derived. It should be noted that the shape trimmed in the grinding step is further maintained as the machine allowance of the edge surface polishing decreases, and thus shape accuracy can be increased. In other words, a difference in the radius of curvature can be reduced at adjacent measurement positions in the circumferential direction of the inner circumferential edge portion.

The radius of curvature of one glass substrate was derived as follows. Specifically, 24 points of the inner circumferential edge portion, namely 12 points on the surface side and 12 points on the back side, were measured in total. Then, a difference in the radius of curvature between adjacent measurement points in the 12 points on the surface side (twelve sets of data) and a difference in the radius of curvature between adjacent measurement points in the 12 points on the back side (twelve sets of data) were derived, and among twenty-four sets of data in total, the maximum value was used as the maximum value of the radius of curvature of the glass substrate. Examples of measurement data are shown in Table 3. In Table 3, the surface and the back of the glass substrate, which was the measurement target, are respectively indicated as an A surface and a B surface. Also, in Table 3, a difference in the radius of curvature when "0 to 30 degrees" means the absolute value of differences in the radii of curvature between a measurement point at 0 degrees and a measurement point at 30 degrees, for example. Also, the position of the A surface at 30 degrees on the back side was corresponded to the position of the B surface at 30 degrees, for example.

When the maximum value of a difference in the radius of curvature was derived with regard to the ten samples of the working examples 1, 7, and 8, the ten samples of the working example 1 had a maximum value of 0.010 mm or less, the ten samples of the working example 7 had a maximum value of 0.005 mm or less, and the ten samples of the working example 8 had a maximum value of 0.012 mm or less. Examples of measurement data shown in Table 3 are data of one sample having the largest maximum value of differences in the radii of curvature of the working examples.

With regard to the working examples 1, 7, and 8, Table 4 shows the maximum value of differences in radii of curvature (same as the value indicated in Table 3; the maximum value of the ten samples) and variation in the shape evaluation value. It could be found from Table 4 that by setting the maximum value of differences in radii of curvature to 0.01 mm or less, variation in the shape evaluation value could be significantly reduced.

TABLE 3

| | Difference in radius of curvature (mm) | | | | | |
|---|---|---|---|---|---|---|
| | Work. Ex. 1 | | Work. Ex. 7 | | Work. Ex. 8 | |
| | A surface | B surface | A surface | B surface | A surface | B surface |
| 0 to 30 degrees | 0.005 | 0.009 | 0.003 | 0.003 | 0.006 | 0.008 |
| 30 to 60 degrees | 0.003 | 0.009 | 0.002 | 0.004 | 0.003 | 0.004 |
| 60 to 90 degrees | 0.005 | 0.010 | 0.002 | 0.003 | 0.010 | 0.002 |
| 90 to 120 degrees | 0.004 | 0.009 | 0.004 | 0.004 | 0.009 | 0.003 |
| 120 to 150 degrees | 0.006 | 0.009 | 0.002 | 0.003 | 0.011 | 0.001 |
| 150 to 180 degrees | 0.005 | 0.007 | 0.003 | 0.002 | 0.004 | 0.008 |
| 180 to 210 degrees | 0.005 | 0.008 | 0.001 | 0.003 | 0.004 | 0.002 |
| 210 to 240 degrees | 0.002 | 0.007 | 0.001 | 0.002 | 0.010 | 0.003 |
| 240 to 270 degrees | 0.007 | 0.006 | 0.004 | 0.004 | 0.003 | 0.005 |
| 270 to 300 degrees | 0.006 | 0.008 | 0.003 | 0.004 | 0.004 | 0.007 |
| 300 to 330 degrees | 0.005 | 0.006 | 0.005 | 0.005 | 0.012 | 0.011 |
| 330 to 360 degrees | 0.003 | 0.007 | 0.005 | 0.003 | 0.009 | 0.010 |
| Max. value of differences | 0.010 | | 0.005 | | 0.012 | |

TABLE 4

| | Max. value of differences of radii of curvature (mm) | Variation in shape evaluation value (μm) |
|---|---|---|
| Work. Ex. 1 | 0.010 | 0.3 |
| Work. Ex. 7 | 0.005 | 0.2 |
| Work. Ex 8 | 0.012 | 0.6 |

Also, similarly to the above, a 2.5-inch magnetic-disk glass substrate was produced such that the thickness and the length of the side wall surface on the inner diameter side were changed respectively to 0.635 mm and 0.335 mm. The roundness of the inner hole of this glass substrate was 1.5 μm or less. Also, when the shape evaluation values of the inner hole of the glass substrate were measured similarly to the above except that three outlines of the inner hole of this glass substrate were spaced apart by 100 μm, the shape evaluation value was 3.4 μm. Similarly to the above, when this glass substrate was used to produce a magnetic disk and fluttering characteristics thereof were evaluated, the fluttering level was 2.

Furthermore, with regard to the magnetic-disk glass substrate having a thickness of 0.635 mm, glass substrates that were different in the shape evaluation value of the inner hole were produced (comparative example 5 and working examples 9 and 10) by adjusting the inclination angle (α in FIG. 5) of the glass substrate with respect to the groove direction of the grindstone and the other factors (e.g., grit of the grindstone, and circumferential speed of the grindstone or the glass substrate) as appropriate. It should be noted that the working examples 9 and 10 were produced by increasing the above-described α=5 degrees as a reference such that the working examples 9 and 10 were different in the shape index value. Measurement results of the comparative example 5 and working examples 9 and 10 are shown in Table 5.

As shown in Table 5, in the case where the thickness was 0.635 mm, it was confirmed that if the shape evaluation value of the inner hole of the magnetic disk was 3.5 μm or less, the fluttering characteristics of the HDD were favorable, whereas if the shape evaluation value was 2.5 μm or less, the fluttering characteristics were further improved.

TABLE 5

| | Shape evaluation value of inner hole (μm) | Fluttering characteristic value |
|---|---|---|
| Comp. Ex. 5 | 3.9 | Level 3 |
| Work. Ex. 9 | 2.3 | Level 1 |
| Work. Ex 10 | 1.7 | Level 1 |

Next, when the flatness of the clamp region of the main surface of the magnetic-disk glass substrate of the working example 1 was measured, the flatness was 1.1 μm. Also, when the magnetic-disk glass substrate of the working example 1 was produced, the parallelism of the polishing surface of the upper and lower grinding surface plates was reduced during main surface polishing, as a result of which the flatness of the clamp region was 0.7 μm. It should be noted that the parallelism of the polishing surfaces (polishing surfaces of polishing pads attached to the upper and lower surface plates) of the upper and lower surface plates was derived as follows. Specifically, when the distance between the polishing surface of the upper surface plate and the polishing surface of the lower surface plate in the inner circumferential edge portions of the upper and lower surface plates was D1 and the distance between the polishing surface of the upper surface plate and the polishing surface of the lower surface plate in the outer circumferential edge portion was D2, the absolute value of (D2-D1) was parallelism.

When the fluttering characteristic value was measured using a magnetic disk substrate, which was based on the magnetic-disk glass substrate in which the clamp region had a flatness of 0.7 μm, the flatness of the clamp region was reduced by approximately 10% compared to a case of the 1.1 μm. In other words, it was confirmed that when the flatness of the clamp region was reduced, fluttering was improved.

While the magnetic-disk glass substrate and the magnetic disk according to the present invention have been described in detail, the present invention is not limited to the above-described embodiment, and it will be appreciated that various improvements and modifications can be made without departing from the gist of the present invention.

What is claimed is:

1. An annular substrate to be polished for manufacturing a magnetic-disk substrate having a circular hole at a center, and comprising a pair of main surfaces and a side wall surface orthogonal to the main surfaces,
   a roundness of the circular hole being 1.5 μm or less,
   in the side wall surface of the circular hole, three outlines in a circumferential direction of the side wall surface, which include an outline at a center position of a thickness of the substrate and outlines at two positions that are spaced apart from the center position in opposite directions along a substrate thickness direction by a predetermined distance, being obtained,
   a difference between a maximum value and a minimum value of radii of three inscribed circles that are respectively derived from the three outlines being 3.5 μm or less, and
   when positions spaced apart from the center position in the opposite directions along the substrate thickness direction by 200 μm exist on the side wall surface, the predetermined distance being 200 μm, and when positions spaced apart from the center position in the opposite directions of the substrate thickness direction by 200 μm do not exist on the side wall surface, the predetermined distance being 100 μm,
   a substrate thickness of the annular substrate being 0.8 mm or less.

2. The annular substrate according to claim 1, wherein a substrate thickness of the annular substrate is 0.635 mm or less.

3. The annular substrate according to claim 1, wherein a surface roughness Rz of the side wall surface of the circular hole is 0.2 μm or less.

4. The annular substrate according to claim 1, wherein an average coefficient of thermal expansion from 100° C. to 300° C. is $60 \times 10^{-7}$ [$K^{-1}$] or less.

5. The annular substrate according to claim 1, wherein with regard to the surface roughness of the side wall surface of the circular hole, in a case where a maximum height in the substrate thickness direction is Rz(t) and a maximum height in the circumferential direction is Rz(c), Rz(t)/Rz(c) is 1.2 or less.

6. The annular substrate according to claim 1, wherein when a measurement point is provided every 30 degrees in the circumferential direction referenced on the center of the annular substrate, and a radius of curvature of a shape of a portion between the side wall surface and a chamfered surface of the circular hole at the measurement point is derived, a difference in the radius of curvature between adjacent measurement points is 0.01 mm or less.

7. A method for manufacturing a magnetic-disk substrate, the method comprising:
   polishing at least the main surfaces of the annular substrate according to claim 1.

8. A method for manufacturing a magnetic disk, the method comprising:
   forming at least a magnetic layer on a main surface of the magnetic-disk substrate obtained from the method according to claim 7.

9. A magnetic-disk substrate having a circular hole at a center, and comprising a pair of main surfaces and a side wall surface orthogonal to the main surfaces,
   a roundness of the circular hole being 1.5 μm or less,
   in the side wall surface of the circular hole, three outlines in a circumferential direction of the side wall surface, which include an outline at a center position of a thickness of the substrate and outlines at two positions that are spaced apart from the center position in opposite directions along a substrate thickness direction by a predetermined distance being obtained,
   a difference between a maximum value and a minimum value of radii of three inscribed circles that are respectively derived from the three outlines being 3.5 μm or less, and
   when positions spaced apart from the center position in the opposite directions along the substrate thickness direction by 200 μm exist on the side wall surface, the predetermined distance being 200 μm, and when positions spaced apart from the center position in the opposite directions of the substrate thickness direction by 200 μm do not exist on the side wall surface, the predetermined distance being 100 μm, a substrate thickness of the magnetic-disk substrate being 0.8 mm or less.

10. The magnetic-disk substrate according to claim 9, wherein
a substrate thickness of the magnetic-disk substrate is 0.635 mm or less.

11. A magnetic disk in which at least a magnetic layer is formed on a main surface of the magnetic-disk substrate according to claim 10.

12. A hard disk drive comprising:
the magnetic disk according to claim 11.

13. The magnetic-disk substrate according to claim 9, wherein
a surface roughness Rz of the side wall surface of the circular hole is 0.2 μm or less.

14. The magnetic-disk substrate according to claim 9, wherein
an average coefficient of thermal expansion from 100° C. to 300° C. is $60 \times 10^{-7}$ [$K^{-1}$] or less.

15. A magnetic disk in which at least a magnetic layer is formed on a main surface of the magnetic-disk substrate according to claim 14.

16. A hard disk drive comprising:
the magnetic disk according to claim 15.

17. The magnetic-disk substrate according to any of claim 9, wherein
with regard to the surface roughness of the side wall surface of the circular hole, in a case where a maximum height in the substrate thickness direction is Rz(t) and a maximum height in the circumferential direction is Rz(c), Rz(t)/Rz(c) is 1.2 or less.

18. The magnetic-disk substrate according to claim 9, wherein
when a measurement point is provided every 30 degrees in the circumferential direction referenced on the center of the substrate, and a radius of curvature of a shape of a portion between the side wall surface and a chamfered surface of the circular hole at the measurement point is derived, a difference in the radius of curvature between adjacent measurement points is 0.01 mm or less.

19. A magnetic disk in which at least a magnetic layer is formed on a main surface of the magnetic-disk substrate according to claim 9.

20. A hard disk drive comprising:
the magnetic disk according to claim 19.

* * * * *